United States Patent
Wang et al.

(10) Patent No.: US 9,780,686 B1
(45) Date of Patent: Oct. 3, 2017

(54) POWER SUPPLYING APPARATUS AND METHOD

(71) Applicant: Chicony Power Technology Co., Ltd., New Taipei (TW)

(72) Inventors: Yang Wang, New Taipei (TW); Hsuan-Yu Lai, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/229,101

(22) Filed: Aug. 4, 2016

(30) Foreign Application Priority Data

Jun. 2, 2016 (TW) .............................. 105208318 U

(51) Int. Cl.
*H02M 1/00* (2006.01)
*H02M 7/04* (2006.01)
*H02M 1/44* (2007.01)

(52) U.S. Cl.
CPC ............... *H02M 7/04* (2013.01); *H02M 1/44* (2013.01)

(58) Field of Classification Search
CPC ... H02M 2001/007; H02M 2001/0025; H02M 3/156; H02M 3/335; H02M 7/06; H02M 7/217; G05F 1/10; G05F 1/46; G05F 3/02
See application file for complete search history.

(56) References Cited

U.S. PATENT DOCUMENTS

2007/0205666 A1* 9/2007 Menas ...................... G06F 1/26 307/38
2014/0032942 A1* 1/2014 Takehara .............. H02M 3/156 713/300

\* cited by examiner

*Primary Examiner* — Adolf Berhane
*Assistant Examiner* — Afework Demisse
(74) *Attorney, Agent, or Firm* — CKC & Partners Co., Ltd.

(57) ABSTRACT

A power supplying apparatus includes a voltage outputting module and a voltage selecting module. The voltage selecting module is electrically connected to the voltage outputting module. The voltage selecting module includes a returning unit. The voltage selecting module receives a voltage identification signal when the voltage outputting module is electrically connected to an electronic device. When the voltage identification signal is larger than a voltage level, the returning unit notifies the electronic device, such that the electronic device returns a voltage request signal. The power supplying apparatus selectively sends out one of a plurality of DC voltage signals to the electronic device according to the voltage request signal.

14 Claims, 5 Drawing Sheets

US 9,780,686 B1

POWER SUPPLYING APPARATUS AND METHOD

RELATED APPLICATIONS

This application claims priority to Taiwanese Application Serial Number 105208318, filed Jun. 2, 2016, which is herein incorporated by reference.

BACKGROUND

Technical Field

The present disclosure relates to a power supplying technology. More particularly, the present disclosure relates to a power supplying apparatus and a power supplying method.

Description of Related Art

A power supplying apparatus is configured to convert AC to DC to provide a driving voltage to an electronic device. With the development of technology, various types of tips of the electronic devices have been generated, and various protocols are configured to conduct communication between the power supplying apparatus and the electronic devices. However, if the type of the tip of the power supplying apparatus does not match that of the electronic device, or if the communication protocol of the power supplying apparatus does not match that of the electronic device, the power supplying apparatus is unable to provide sufficient power to the electronic device.

SUMMARY

One embodiment of the present disclosure is related to a power supplying apparatus. The power supplying apparatus includes a voltage outputting module and a voltage selecting module. The voltage selecting module is electrically connected to the voltage outputting module. The voltage selecting module includes a returning unit. The voltage selecting module receives a voltage identification signal when the voltage outputting module is electrically connected to an electronic device. The returning unit notifies the electronic device when the voltage identification signal is larger than a voltage level, such that the electronic device returns a voltage request signal. The power supplying apparatus selectively sends out one of DC voltage signals to the electronic device according to the voltage request signal.

One embodiment of the present disclosure is related to a power supplying method. The power supplying method includes: receiving a voltage identification signal by a voltage selecting module of a power supplying apparatus when a voltage outputting module of the power supplying apparatus is electrically connected to an electronic device; notifying the electronic device by a returning unit of the power supplying apparatus when the voltage identification signal is larger than a voltage level, such that the electronic device returns a voltage request signal; and selectively sending out one of a plurality of DC voltage signals to the electronic device according to the voltage request signal by the power supplying apparatus.

As the above embodiments, the power supplying apparatus determines how to provide electrical power to the electronic device according to the voltage identification signal generated when the voltage outputting module is connected to the electronic device. Since the voltage identification signals corresponds to different voltage outputting module, the power supplying apparatus is able to determine how to provide electrical power to the electronic devices corresponding to different voltage outputting module according to different voltage outputting module. Further, various communication protocols between the power supplying apparatus and the electronic devices are applicable.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
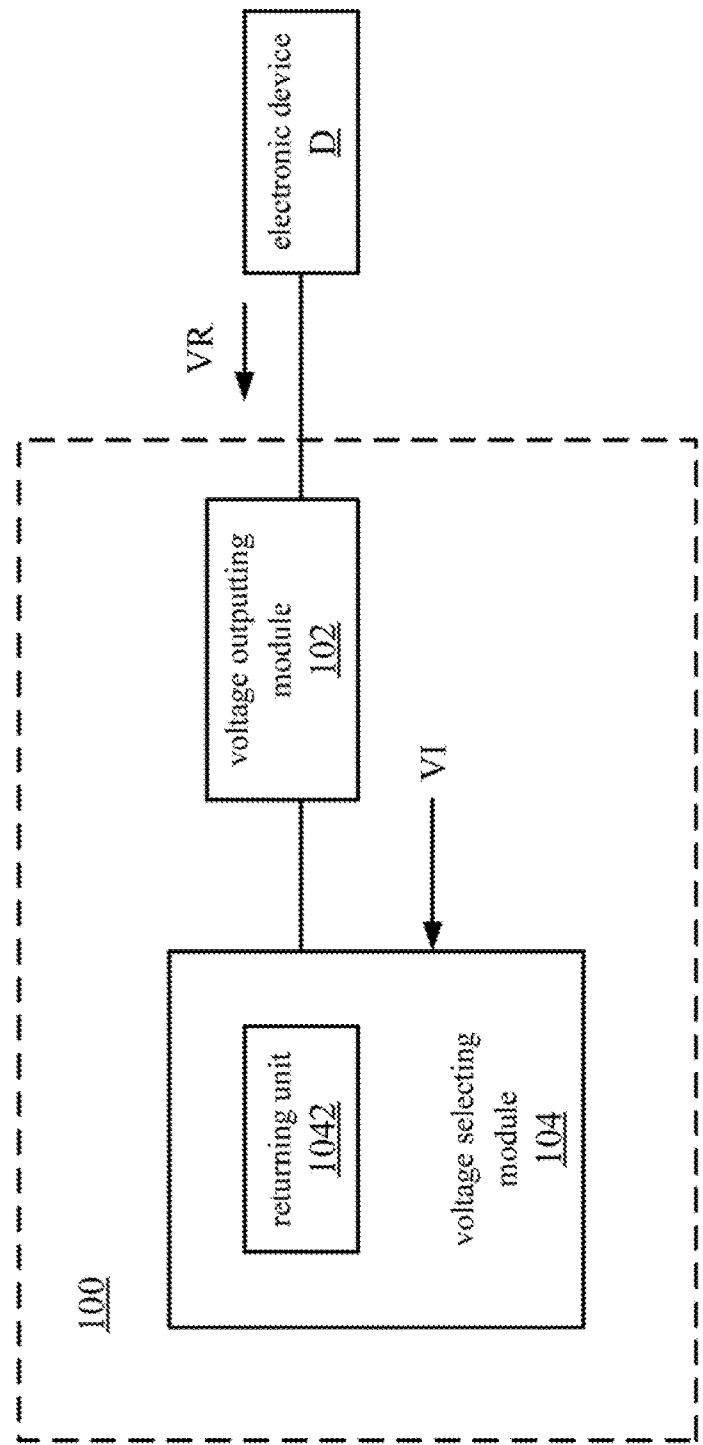
FIG. 1 is a schematic diagram illustrating a power supplying apparatus and an electronic device according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

Moreover, the drawings are for the purpose of illustration only, and are not in accordance with the size of the original drawing. The components in description are described with the same number to understand.

FIG. 1 is a schematic diagram illustrating a power supplying apparatus 100 and an electronic device D according to one embodiment of the present disclosure. The power supplying apparatus 100 is configured to convert an AC voltage signal to a DC voltage signal provided to the electronic device D. The power supplying apparatus 100 is, for example, a power adaptor meeting a universal serial bus (USB) power delivery (PD) standard. The electronic device is, for example, a notebook, a hard disk, a smart phone, a server, an unmanned flying vehicle, or one of other various electronic devices or equipment which needs power.

As illustrated in FIG. 1 the power supplying apparatus 100 includes a voltage outputting module 102 and a voltage selecting module 104. The voltage selecting module 104 is electrically connected to the voltage outputting module 102. The voltage selecting module 104 includes a returning unit 1042.

The voltage selecting module 104 receives a voltage identification signal VI when the voltage outputting module 102 is electrically connected to the electronic device D. The voltage selecting module 104 compares the voltage identification signal VI with a voltage level. In some embodiments, the voltage level is, for example, 0.8 volts, but is not limited thereto.

In some embodiments, the voltage outputting module 102 is an interchangeable tip. The interchangeable tip is, for example, a Type-C tip or a non-Type-C tip. Thus, by changing the type of the voltage outputting module 102, the power supplying apparatus 100 is able to provide electrical power to the electronic device with a different type of tip.

The voltage identification signal VI is larger than the voltage level when the voltage outputting module 102 is a Type-C tip. The voltage identification signal VI is not larger than the voltage level when the voltage outputting module 102 is a non-Type-C tip.

The returning unit 1042 notifies the electronic device D via the voltage outputting module 102 when the voltage identification signal VI is larger than the voltage level. The electronic device D returns a voltage request signal VR to the power supplying apparatus 100 when the electronic device D is notified. The power supplying apparatus 100 sends out one of a plurality of DC voltage signals to the electronic device D according to the voltage request signal VR, to provide electrical power to the electronic device D.

In some embodiments, the voltage values of the aforementioned DC voltage signals are, for example, 5 volts, 12 volts, 15 volts, and 20 volts, but are not limited thereto. The DC voltage signals with different voltage values are applied to different electronic devices. For example, the voltage request signal VR outputted from the electronic device D corresponds to 5 volts when the electronic device D is a smart phone. For example, the voltage request signal VR outputted from the electronic device D corresponds to 12 volts when the electronic device D is a hard disk.

The power supplying apparatus 100 sends out a default voltage signal to the electronic device D when the voltage identification signal VI is not larger than the voltage level. The voltage value of the default voltage signal is a fixed value. In some embodiments, the voltage value of the default voltage signal is, for example, 20 volts, but is not limited thereto.

Figure 2:
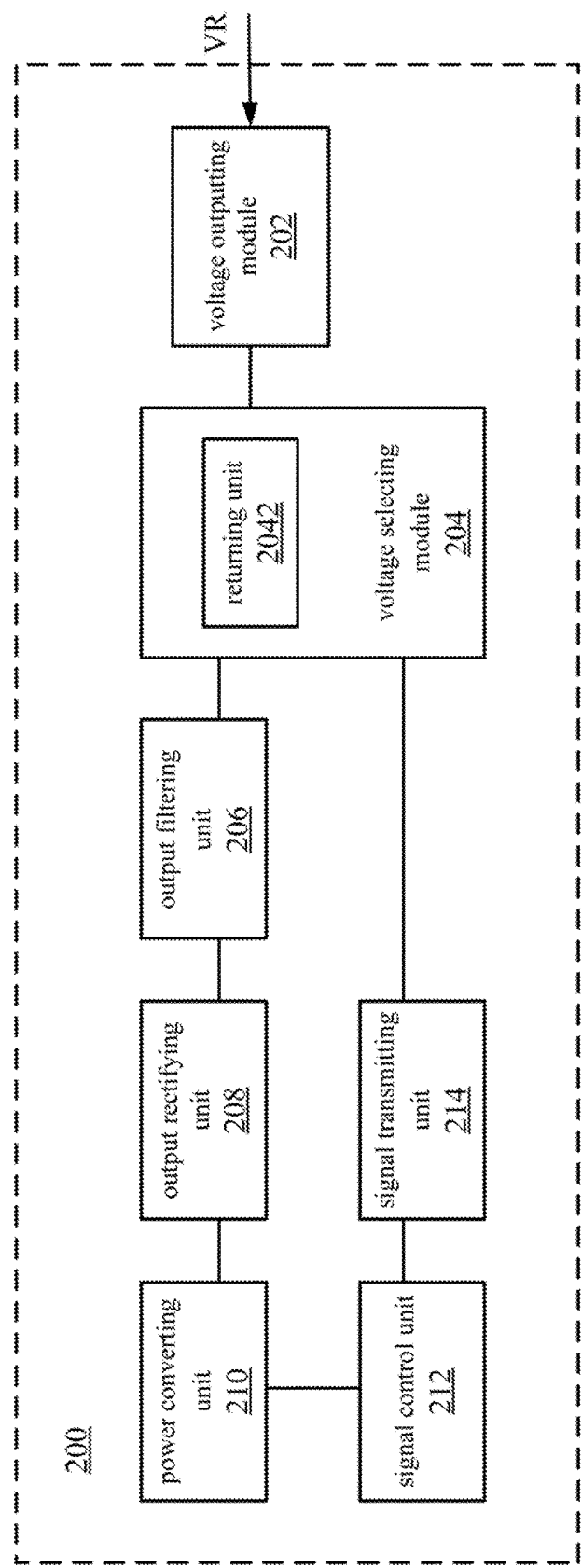
FIG. 2 is a schematic diagram illustrating a power supplying apparatus according to one embodiment of the present disclosure.

FIG. 2 is a schematic diagram illustrating a power supplying apparatus 200 according to one embodiment of the present disclosure. A voltage outputting module 202, a voltage selecting module 204, and a returning unit 2042 in FIG. 2 are respectively similar to the voltage outputting module 102, the voltage selecting module 104, and the returning unit 1042 in FIG. 1.

As illustrated in FIG. 2, the power supplying apparatus 200 further includes an outputting filtering unit 206, an outputting rectifying unit 208, a power converting unit 210, a signal control unit 212, and a signal transmitting unit 214.

The output filtering unit 206 is electrically connected to the voltage selecting module 204. The output rectifying unit 208 is electrically connected to the output filtering unit 206. The power converting unit 210 is electrically connected to the output rectifying unit 208. The signal control unit 212 is electrically connected to the power converting unit 210. The signal transmitting unit 214 is electrically connected to the signal control unit 212 and the voltage selecting module 204.

The aforementioned units may be implemented in circuits or hardware with corresponding functions. For example, the output filtering unit 206 is implemented by an output filtering circuit. The output rectifying unit 208 is implemented by an output rectifying circuit. The power converting unit 210 is implemented by a power converting circuit. The signal control unit 212 is implemented by a pulse width modulation (PWM) controller. The signal transmitting unit 214 is implemented by a feedback circuit.

As shown in aforementioned embodiments, the power supply apparatus 200 receives the voltage request signal VR from the electronic device D. The voltage outputting module 202 transmits the voltage request signal VR to the voltage selecting module 204. The voltage selecting module 204 transmits the voltage request signal VR to the signal transmitting unit 214. The signal transmitting unit 214 transmits the voltage request signal VR to the signal control unit 212. The signal control unit 212 controls the power converting unit 210 to convert the AC voltage signal to a DC voltage signal with a specific voltage value (such as, 5 volts, 12 volts, 15 volts, and 20 volts) according to the voltage request signal VR.

The DC voltage signal converted by the power converting unit 210 is rectified by the output rectifying unit 208. The DC voltage signal rectified by the output rectifying unit 208 is then filtered by the output filtering unit 206. The rectified and filtered DC voltage signal is transmitted to the voltage outputting module 202 via the voltage selecting module 204, and is outputted to the electronic device Q from the voltage outputting module 202.

Figure 3:
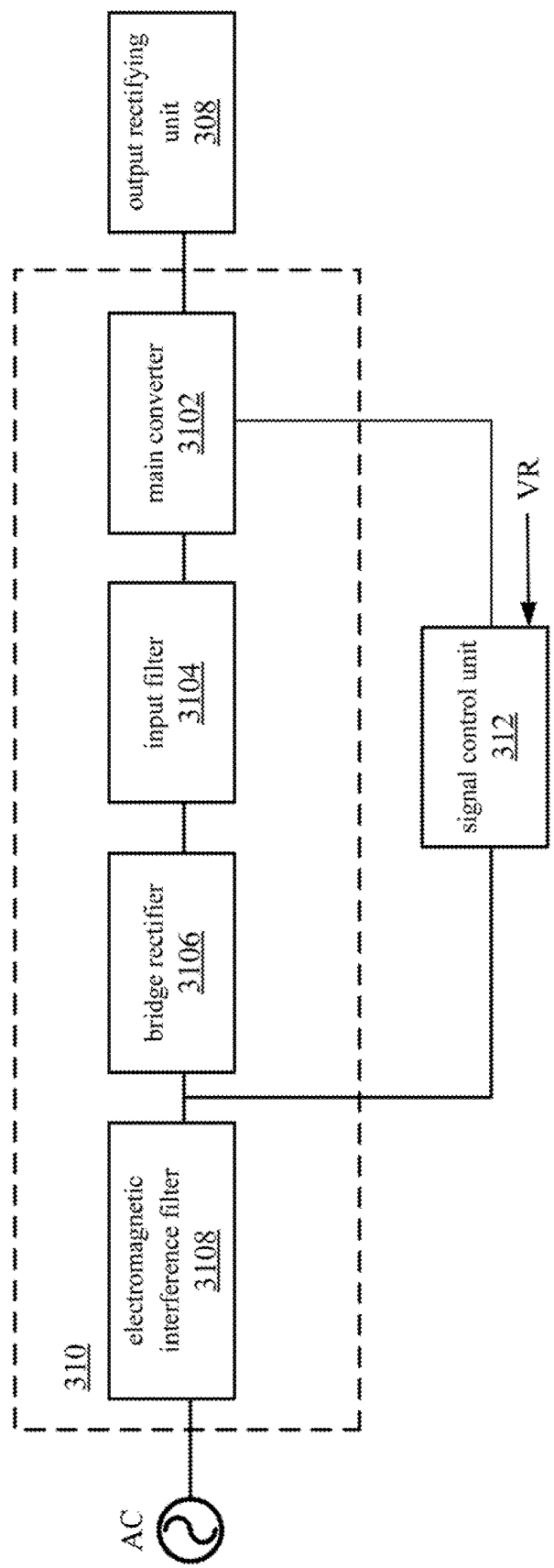
FIG. 3 is a schematic diagram illustrating a power converting unit, an output rectifying unit, and a signal control unit according to one embodiment of the present disclosure.

FIG. 3 is a schematic diagram illustrating a power converting unit 310, an output rectifying unit 308, and a signal control unit 312 according to one embodiment of the present disclosure. The outputting unit 308 and the signal control unit 312 in FIG. 3 are respectively similar to the outputting unit 208 and the signal control unit 212 in FIG. 2. The power converting unit 310 in FIG. 3 may be configured to be applied to the power converting unit 210 in FIG. 2.

As illustrated in FIG. 3, the power converting unit 310 includes a main converter 3102, an input filter 3104, a bridge rectifier 3106, and an electromagnetic interference filter 3108.

The main converter 3102 is electrically connected to the output rectifying unit 308. The output filter 3104 is electrically connected to the main converter 3102. The bridge rectifier 3106 is electrically connected to the input filter 3104. The electromagnetic interference (EMI) filter 3108 is electrically connected to the bridge rectifier 3106. The signal control unit 312 is electrically connected to the main converter 3102 and the bridge rectifier 3106.

The AC voltage source AC is configured to provide the AC voltage signal. The EMI filter 3108 receives and filters the AC voltage signal. The AC voltage signal filtered by the EMI filter 3108 is rectified by the bridge rectifier 3106. The rectified AC voltage signal from the bridge rectifier 3106 is then filtered by the input filter 3104. The rectified and filtered AC voltage signal is transmitted to the main converter 3102.

As shown in aforementioned embodiments, the voltage request signal VR is received by the signal control unit 312. The signal control unit 312 controls the main converter 3102 to convert the AC voltage signal to the DC voltage signal with a specific voltage value according to the voltage request signal VR. The DC voltage signal converted by the main converter 3102 is rectified by the output rectifying unit 308. Remaining description of this embodiment is similar to the aforementioned embodiments, and thus is not described again.

Figure 4:
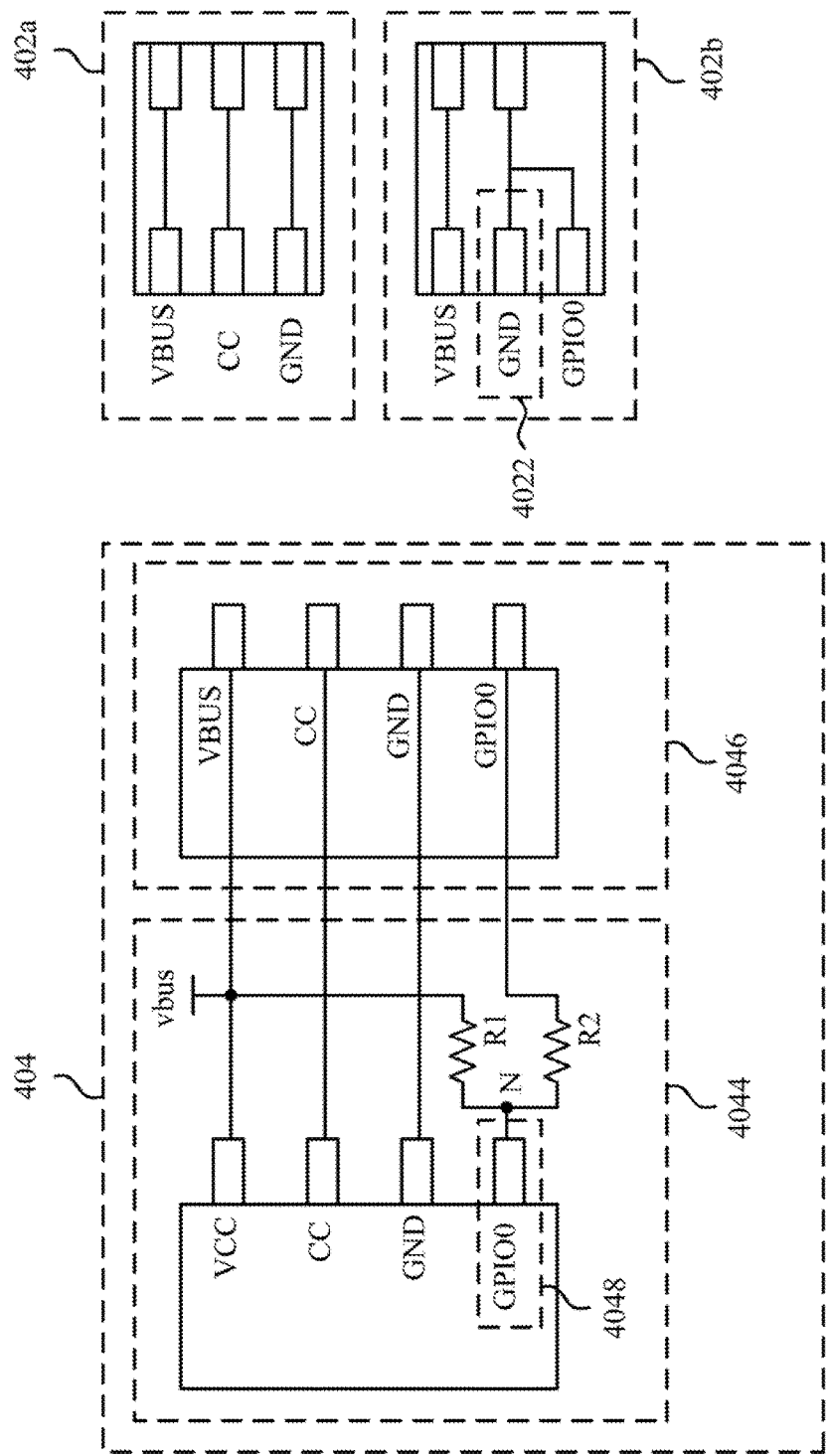
FIG. 4 is a schematic diagram illustrating a voltage selecting module and different voltage outputting modules according to one embodiment of the present disclosure.

FIG. 4 is a schematic diagram illustrating a voltage selecting module 404 and different voltage outputting modules 402a and 402b according to one embodiment of the present disclosure. As illustrated in FIG. 4, the voltage selecting module 404 includes a voltage selecting unit 4044 and a connecting interface 4046. The voltage selecting unit 4044 may be a main body of a power adaptor. The connecting interface 4046 may be a cable. The voltage selecting unit 4044 is electrically connected to the connecting interface.

Four terminals VCC, CC, GND, and GPIO0 of the voltage selecting unit 4044 are respectively configured to be connected to four terminals VBUS, CC, GND, and GPIO0 of the connecting interface 4046. The terminal CC is a configuration channel. The terminal CC may be applied in the returning unit 1042 or the returning unit 2042 in the aforementioned embodiments.

The voltage outputting module 402a may be a Type-C tip, and the voltage outputting module 402b may be a non-Type-C tip. The connecting interface 4046 may be connected to the voltage outputting module 402a or 402b. When the connecting interface 4046 is connected to the voltage outputting module 402a, the power supplying apparatus is configured to provide electrical power to the electronic device with the Type-C tip. When the connecting interface 4046 is connected to the voltage outputting module 402b, the power supplying apparatus is configured to provide electrical power to the electronic device with the non-Type-C tip.

The voltage selecting unit 4044 includes a working voltage source vbus, a receiving unit 4048, a first resistor R1, and a second resistor R2. The receiving unit 4048 may be the terminal GPIO0 of the voltage selecting unit 4044. The first resistor R1 is electrically connected between the working voltage source vbus and the receiving unit 4048. The second resistor R2 is electrically connected between the receiving unit 4048 and the terminal GPIO0 of the voltage selecting unit 4046.

When the voltage outputting module 402a (such as, a Type-C tip) is electrically connected to the connecting interface 4046, the terminals VBUS, CC, and GND of the voltage outputting module 402a are respectively and electrically connected to the terminals VBUS, CC, GND of the connecting interface 4046.

Under a condition that the voltage outputting module 402a is electrically connected to the connecting interface 4046, there is no terminal connected to the terminal GPIO0 of the connecting interface 4046, and thus a voltage signal of the working voltage source vbus is transmitted to the receiving unit 4048 via the first resistor R1. In other words, the working voltage source vbus sends out the voltage identification signal to the receiving unit 4048. At this time, the voltage identification signal at a node N is larger than the aforementioned voltage level (such as, 0.8 volts).

When the voltage outputting module 402b (such as, non-Type-C tip) is electrically connected to the connecting interface 4046, the terminals VBUS, GND, and GPIO0 of the voltage outputting module 402b are correspondingly and electrically connected to the terminals VBUS, GND, and GPIO0 of the connecting interface 4046.

Under a condition that the voltage outputting module 402b is electrically connected to the connecting interface 4046, the terminal GPIO0 of the connecting interface 4046 is electrically connected to the terminal GPIO0 of the voltage outputting module 402b. The terminal GPIO0 of the voltage outputting module 402b is electrically connected to a ground unit 4022 (terminal GND) of the voltage outputting module 402b. In other words, the second resistor R2, the terminal GIPO0 of the connecting interface 4046, the terminal GIPO0 of the voltage outputting module 402b, and the ground unit 4022 of the voltage outputting module 402b form a voltage pull down path when the voltage outputting module 402b is electrically connected to the connecting interface 4046. The voltage signal of the working voltage source vbus is transmitted to the ground unit 4022 via the first resistor R1, the second resistor R2, the terminal GIPO0 of the connecting interface 4046, and the terminal GIPO0 of the voltage outputting module 402b. In other words, the voltage identification signal at the node N is pulled down via the voltage pull down path. At this time, the voltage identification signal at the node N is not larger than the aforementioned voltage level (such as, 0.8 volts).

Figure 5:
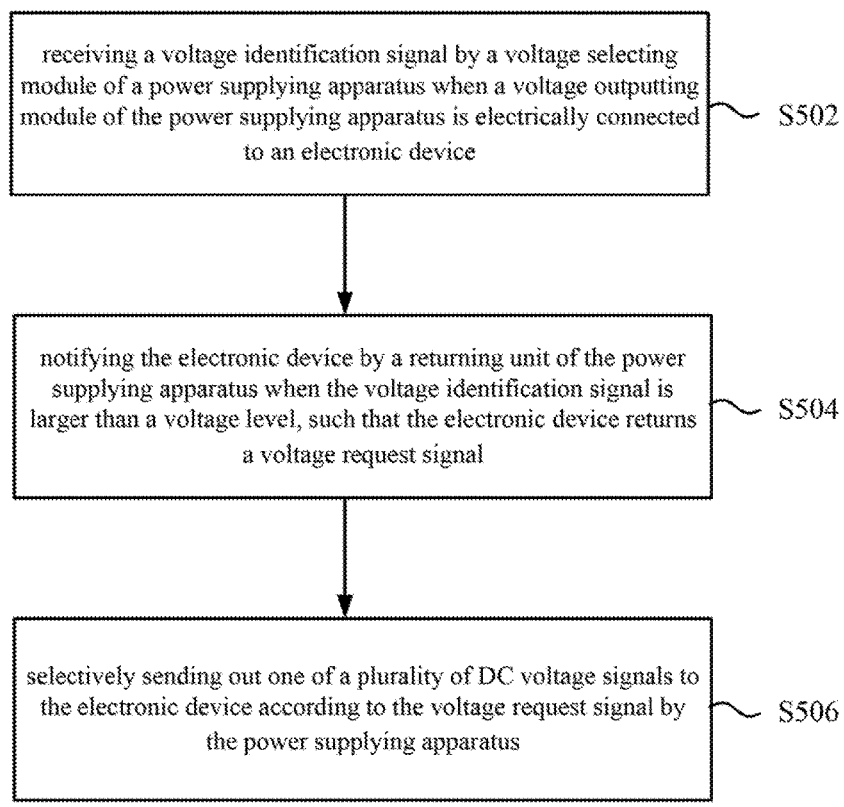
FIG. 5 is a flow diagram illustrating a power supplying method according to one embodiment of the present disclosure.

FIG. 5 is a flow diagram illustrating a power supplying method 500 according to one embodiment of the present disclosure. As illustrated in FIG. 5, the method 500 at least includes step S502, step S504, and step S506. In some embodiments, the method 500 may be implemented in the power supplying apparatus 100 and the electronic device D in FIG. 1.

In the example shown in FIG. 1, step S502 is performed for receiving the voltage identification signal VI by the voltage selecting module 104 of the power supplying apparatus 100 when the voltage outputting module 102 of the power supplying apparatus 100 is electrically connected to the electronic device D.

In the example shown in FIG. 1, step S504 is performed for notifying the electronic device D by the returning unit 1042 of the power supplying apparatus 100 when the voltage identification signal VI is larger than a voltage level, such that the electronic device D returns the voltage request signal VR.

In the example shown in FIG. 1, step S506 is performed for selectively sending out one of a plurality of DC voltage signals to the electronic device D according to the voltage request signal VR by the power supplying apparatus 100.

As the above embodiments, the power supplying apparatus determines how to provide electrical power to the electronic device according to the voltage identification signal generated when the voltage outputting module is connected to the electronic device. Since the voltage identification signals corresponds to different voltage outputting module, the power supplying apparatus is able to determine how to provide electrical power to the electronic devices corresponding to different voltage outputting module according to different voltage outputting module. Further, various communication protocols between the power supplying apparatus and the electronic devices are applicable.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power supplying apparatus, comprising:
a voltage outputting module; and
a voltage selecting module electrically connected to the voltage outputting module, wherein the voltage selecting module comprises a returning unit;
wherein the voltage selecting module receives a voltage identification signal when the voltage outputting module is electrically connected to an electronic device, the returning unit notifies the electronic device when the voltage identification signal is larger than a voltage level such that the electronic device returns a voltage request signal, and the power supplying apparatus selectively sends out one of a plurality of DC voltage signals to the electronic device according to the voltage request signal.

2. The power supplying apparatus of claim 1, wherein the power supplying apparatus sends out a default voltage signal to the electronic device when the voltage identification signal is not larger than the voltage level.

3. The power supplying apparatus of claim 2, wherein a voltage value of the default voltage signal is a fixed value.

4. The power supplying apparatus of claim 1, further comprising:
   an output filtering unit electrically connected to the voltage selecting module;
   an output rectifying unit electrically connected to the output filtering unit;
   a power converting unit electrically connected to the output rectifying unit;
   a signal control unit electrically connected to the power converting unit; and
   a signal transmitting unit electrically connected to the signal control unit and the voltage selecting module to transmit the voltage request signal to the signal control unit.

5. The power supplying apparatus of claim 4, wherein the power converting unit comprises;
   a main converter electrically connected to the signal control unit and the output rectifying unit;
   an input filter electrically connected to the main converter;
   a bridge rectifier electrically connected to the input filter; and
   an electromagnetic interference filter electrically connected to the bridge rectifier, wherein the electromagnetic interference filter receives an AC voltage signal, and the signal control unit controls the main converter to selectively convert the AC voltage signal to the one of the DC voltage signals according to the voltage request signal.

6. The power supplying apparatus of claim 1, wherein the voltage outputting module comprises an interchangeable tip, and the interchangeable tip is a type-C tip.

7. The power supplying apparatus of claim 6, wherein the voltage selecting module comprises a connecting interface, and the connecting interface is electrically connected to the interchangeable tip.

8. The power supplying apparatus of claim 1, wherein the voltage selecting module further comprises a working voltage source, a receiving unit, and a first resistor, and the first resistor is electrically connected to the working voltage source and the receiving unit, and the working voltage source sends out the voltage identification signal to the receiving unit via the first resistor.

9. The power supplying apparatus of claim 8, wherein the voltage selecting module further comprises a second resistor, and the second resistor is electrically connected to the receiving unit, the second resistor and a ground unit of the voltage outputting module form a voltage pull down path, and the voltage identification signal is pulled down via the voltage pull down path.

10. The power supplying apparatus of claim 9, wherein the voltage outputting module comprises an interchangeable tip, and the interchangeable tip is a non-Type-C tip.

11. A power supplying method, comprising:
   receiving a voltage identification signal by a voltage selecting module of a power supplying apparatus when a voltage outputting module of the power supplying apparatus is electrically connected to an electronic device;
   notifying the electronic device by a returning unit of the power supplying apparatus when the voltage identification signal is larger than a voltage level, such that the electronic device returns a voltage request signal; and
   selectively sending out one of a plurality of DC voltage signals to the electronic device according to the voltage request signal by the power supplying apparatus.

12. The power supplying method of claim 11, further comprising:
   sending out a default voltage signal to the electronic device by the power supplying apparatus when the voltage identification signal is not larger than the voltage level.

13. The power supplying method of claim 12, wherein a voltage value of the default voltage signal is a fixed value.

14. The power supplying method of claim 11, wherein the selectively sending out one of the DC voltage signals to the electronic device according to the voltage request signal by the power supplying apparatus comprises:
   receiving an AC voltage signal by an electromagnetic interference filter of the power supplying apparatus; and
   controlling a main converter of the power supplying apparatus to selectively convert the AC voltage signal to the one of the DC voltage signals according to the voltage request signal by a signal control unit of the power supplying apparatus.

* * * * *